United States Patent
Mandal et al.

(10) Patent No.: US 7,000,235 B2
(45) Date of Patent: *Feb. 14, 2006

(54) METHOD AND APPARATUS FOR MANAGING DATA SERVICES IN A DISTRIBUTED COMPUTER SYSTEM

(75) Inventors: Chhandomay Mandal, Nashua, NH (US); Mark J. Musante, Westford, MA (US); Peter J. Wagener, Somerville, MA (US); Roberta A. Pokigo, Billerica, MA (US); Melora L. Goosey, Andover, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 552 days.

This patent is subject to a terminal disclaimer.

(21) Appl. No.: 10/021,471

(22) Filed: Oct. 30, 2001

(65) Prior Publication Data

US 2003/0084198 A1  May 1, 2003

(51) Int. Cl.
*G06F 9/44* (2006.01)

(52) U.S. Cl. .................... 719/315; 707/10; 707/200
(58) Field of Classification Search ........ 709/223–226, 709/315, 316, 321; 719/310, 321; 707/2, 707/9, 201, 200, 10
See application file for complete search history.

(56) References Cited

U.S. PATENT DOCUMENTS 5,794,013 A * 8/1998 McBrearty ............... 703/27
6,269,373 B1 * 7/2001 Apte et al. ............... 707/10
6,434,543 B1 * 8/2002 Goldberg et al. .......... 707/2
6,442,541 B1 * 8/2002 Clark et al. ............... 707/3
6,457,065 B1 * 9/2002 Rich et al. ................ 719/328
6,556,995 B1 * 4/2003 Child et al. ............... 707/9
6,629,128 B1 * 9/2003 Glass ....................... 709/203
6,728,788 B1 * 4/2004 Ainsworth et al. ........ 719/330
6,772,178 B1 * 8/2004 Mandal et al. ........... 707/204

OTHER PUBLICATIONS

Thomas "Enterprise JavaBeans Technology Server Component Model for the Java Platform", Dec. 1998, Patricia Seybold Group pp. 1-24.*
Monson-Haefel "Enterprise JavaBeans", O'reilly, 2nd edition, pp.38-39.*
US 5,781,555, 07/1998, Gostanian et al. (withdrawn)*

* cited by examiner

Primary Examiner—Men-Al T. An
Assistant Examiner—Phuong N. Hoang
(74) Attorney, Agent, or Firm—Kudirka & Jobse, LLP

(57) ABSTRACT

Data services are managed by a three-tiered system. The lowest tier comprises management facade software running on each machine that converts a platform-dependent interface written with the low-level kernel routines that actually implements the data services to platform-independent method calls. The middle tier is a set of federated Java beans that communicate with the management facades and with the upper tier of the system. The upper tier of the inventive system comprises presentation programs that can be directly manipulated by management personnel to view and control the system.

24 Claims, 12 Drawing Sheets

METHOD AND APPARATUS FOR MANAGING DATA SERVICES IN A DISTRIBUTED COMPUTER SYSTEM

FIELD OF THE INVENTION

This invention relates to management of networked computer systems and to data services such as replication, mirroring, and data "snapshots" and, in particular, to distributed management of such data services.

BACKGROUND OF THE INVENTION

It is common in many contemporary computer systems to provide administrative personnel with data services that allow data storage to be controlled and backup copies of stored data to be made where necessary. These data services can include data volume management in which one or more logical "volumes" are created from stored data so that the data in each volume can be manipulated as a unit.

Data backup services may include data replication in which a second copy or "mirror" of information located at a primary site is maintained at a secondary site. When changes are made to the primary data, updates are also made to the secondary data so that the primary data and the secondary data remain "synchronized."

Another data backup service that can be provided is data imaging in which a data copy often called a data "snapshot" or "image" can be made of stored data at a designated point in time. This service provides a system administrator with the ability to make and to maintain the aforementioned replicated data storage systems.

Still other data services can be provided. For example, data stored and retrieved in a data storage system may be transferred through a fast cache memory in a process called "data caching" in order to improve overall data storage performance. Often it is desirable for system administrators to be able to control whether data caching is used with a particular data storage or a data volume residing on that storage in order to effectively use a limited resource.

No matter which of the data services are used, a significant amount of management time can be consumed in initially setting up the data service and managing it after it is running. For example, management of each of the aforementioned data services requires the ability for a manager to discover volumes existing in the system, verify that those volumes are suitable for use with a particular data service and configure the volumes if they are not suitable.

In a large, distributed computer system connected by a network, management personnel and resources may be physically located anywhere in the system. However, the data manipulation processes, which actually perform the data services, are typically low-level routines that are part of an operating system kernel running on a particular machine. These routines typically must run on that machine and are written in a platform-dependent language. Thus, prior art systems required a manager to physically log onto each local host in a distributed system in order to manage data services. Further, there was no way to diagnose problems that occurred when several data services were using the same volume.

SUMMARY OF THE INVENTION

In accordance with the principles of the present invention, management of data services is provided by a three-tiered system. The lowest tier comprises management facade software running on each machine that converts the platform-dependent interface written with the low-level kernel routines to platform-independent method calls. The middle tier is a set of federated Java beans that communicate with the management facades and with the upper tier of the system. The upper tier of the inventive system comprises presentation programs that can be directly manipulated by management personnel to view and control the system.

In one embodiment, each data service is managed by a separate federated bean running in the host where the data service is located. The beans export interfaces containing methods that can be called by the presentation programs so that management personnel located at that host can access and control the data services in that host. In addition, an identifier for each bean in the distributed computer system can be retrieved from a distributed lookup service so that, using the identifier, management personnel located at one host can manage data services located at another host by calling methods in the remote bean.

In another embodiment, a data service station federated bean monitors the distributed lookup service and retrieves and caches the other bean identifiers. Then a presentation program or other user can lookup the data service station bean and quickly discover data services on other hosts and retrieve the appropriate identifier for the beans on that host in order to manage the data services on that host.

In still another embodiment, a data service volume federated bean in each host discovers data volumes on that host and controls the volumes via a data services management facade running on the host. This bean allows a manager to view and configure volumes on that host. The data service volume federated bean can configure and control volumes with either a SCSI terminal emulation interface or a storage volume interface In another embodiment, a configuration manager bean runs on each host and persistently stores configuration information regarding the volumes on that host. The configuration manager federated bean for a host computer is contacted by federated beans that manage each of the data services when a data service starts and stops using a data storage volume associated with the host computer. The data services can access the configuration information during the host system boot process and before file systems are mounted and management software can obtain the same information at a later time in a consistent manner.

In yet another embodiment, a data replication management facade runs on each host and at least one data replication bean also runs on the host. The data replication beans allow a manager located at one host to configure a primary data volume at that host and to configure a secondary data volume at that host or another host in the distributed computer system. A data replication system can then be set up using the bean in the primary host and the bean in the secondary host. Therefore, a user needs to log onto only one machine in order to configure the entire data replication system.

In still another embodiment, a data caching management facade runs on selected hosts and at least one data caching bean also runs on those hosts. The data-caching bean allows a manager to configure an entire data caching system from a single location so that the manager can cache individual volumes "on the fly" during ongoing data processing operations.

In yet another embodiment, a data imaging management facade runs on selected hosts and at least one data imaging bean also runs on those hosts. The data-imaging bean communicates directly with a management GUI or CLI and is controlled by user commands generated by the GUI or CLI. Therefore, a manager can configure the entire data imaging system from a single location.

In another embodiment, the distributed computer system includes an event service to which the federated beans post messages regarding their status and configuration. Another federated bean monitors the event service and sends human-readable messages to administrators in order to inform them that an event in which they may be interested has occurred.

BRIEF DESCRIPTION OF THE DRAWINGS

The above and further advantages of the invention may be better understood by referring to the following description in conjunction with the accompanying drawings in which.

DETAILED DESCRIPTION

Data Services are software products that consist of two parts: a set of kernel drivers, which provides the actual service on the local platforms, and the user level management software. The kernel drivers would generally by implemented in platform-specific code, for example, in C routines that expose application programmer interfaces (APIs) that can be accessed only from the host in which the layer is installed. The set of kernel drivers providing the service can be installed on application servers as well as dedicated storage servers. These installations are illustrated in FIGS. 1A and 1B.

Figure 1:
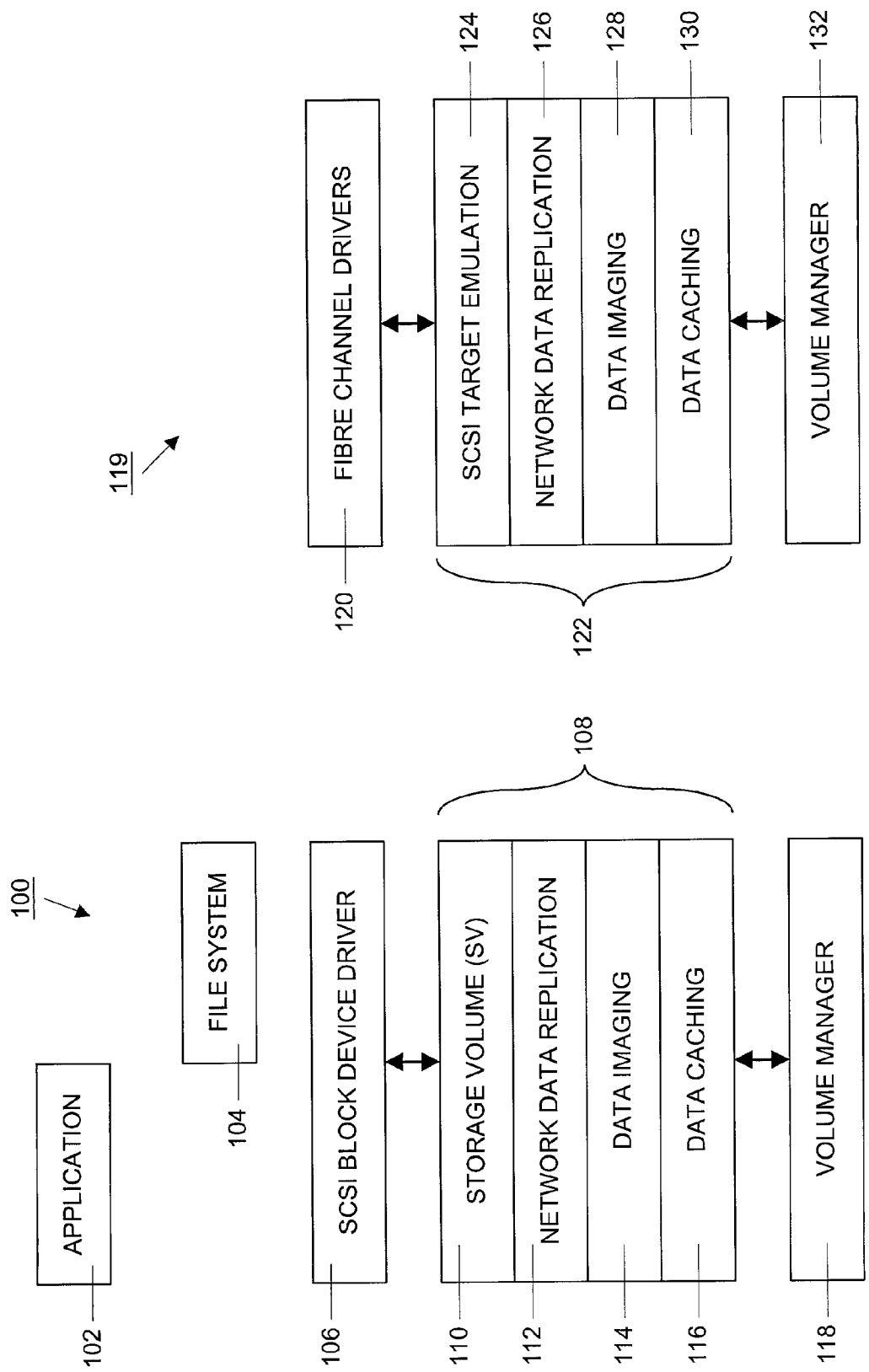
FIG. 1A is a block schematic diagram of illustrating the platform-specific kernel drivers that provide a variety of data services in an application server.
FIG. 1B is a block schematic diagram of illustrating the platform-specific kernel drivers that provide a variety of data services in a storage server.

As shown in FIG. 1A, on an application server 100, the data service kernel modules 108 layer within the operating system I/O stack above volume manager 118 and below the disk device drivers 106. The data service kernel modules include a storage volume module 110 that implements a storage volume (SV) interface data service that provides data redirection. In particular, the storage volume layer 110 insinuates itself between the standard Small Computer Standard Interface (SCSI) block device driver 106 and the underlying drivers and shunts I/O information through the other data service kernel modules 112–116.

The storage network data replicator (SNDR) kernel module 112 provides data replication services that involve transparent replication of volumes over public or private Internet protocol infrastructure, or locally, via SCSI protocol, over fibre channel connections.

The data imaging module 114 implements a "point-in-time" volume copy data service between volumes in a data image volume set. The data image volume set contains the original logical volume (the master volume), the point-in-time copy of the original (the shadow volume) and a volume used to store a bitmap that tracks the differences between the master and shadow volumes. Once the data image volume set is established, the master and shadow volumes can be accessed independently. The data-imaging module allows data updates to be sent from the master volume to the shadow volume as well as updates to be sent from the shadow volume to the master volume when desired.

The caching module 116 provides block based caching operations for disk input/output. These operations provide typical caching functionality, such as read caching, read ahead and small write coalescing for sequential writes. Module 116 also provides write caching when non-volatile RAM cards are installed as a safe store (called a "fast write cache").

On a dedicated storage server 119 as illustrated in FIG. 1B, the kernel modules 122 are located between fibre channel drivers 120 and the volume manager software 132. Modules 122 are accessed through an emulation layer 124 that allows the storage server to appear as a SCSI target to fibre-channel-connected open system hosts. Thus, the SCSI Target Emulation (STE) module 124 provides an STE data service that allows any backend storage to be exported for use on another host through a fiber channel. The host that has the STE kernel module 124 runs a fibre port in SCSI target mode, while the fibre ports at the client run as SCSI initiators.

The network data replicator module 126, the data imaging module 128 and the data caching module 130 operate in the same manner as they do in the application server example shown in FIG. 1A. The data service kernel module architecture requires that any volume that will be used by a data service must already be under the control of either the SCSI Target Emulation (STE) data service module 124, or the Storage Volume Interface (SVI) data service module 110. The difference is that the STE volumes are always exported to remote hosts whereas local volumes must be SVI volumes.

A data services management system constructed in accordance with the principles of the invention comprises three layers or tiers. The first, or upper, tier is a presentation layer with which a manager interacts at a single host location. The upper tier, in turn, interacts with the middle tier comprised of a plurality of federated beans, each of which performs specific tasks in the data services system. The federated beans can communicate with each other both in the same host and in other hosts via a network connecting the hosts. Some of the beans can communicate with the lowest tier that comprises management facades. Management facades communicate to the aforementioned kernel modules that actually perform the data services. In this manner, an entire data service system can be configured and managed from a single location.

Figure 2:
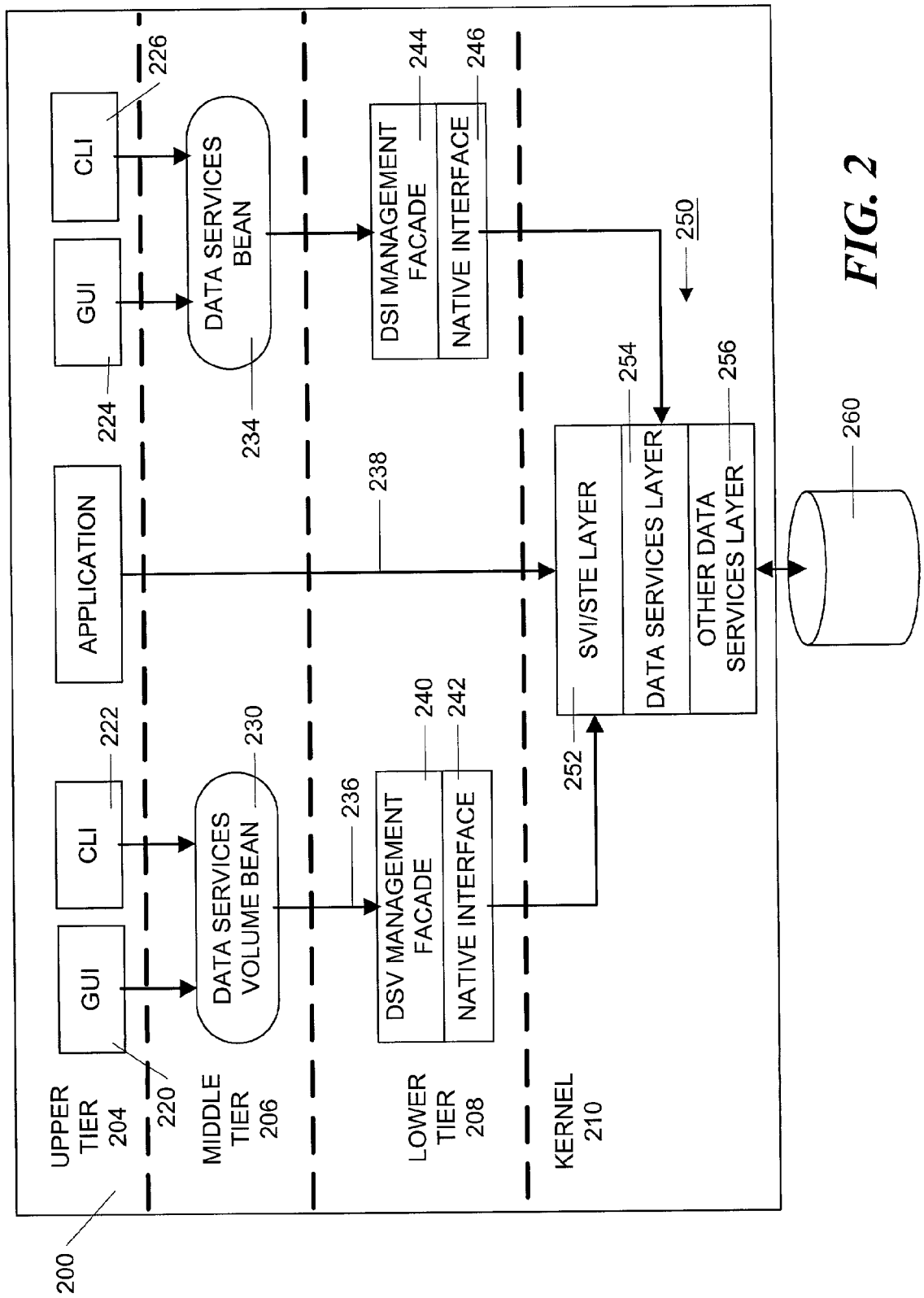
FIG. 2 is a block schematic diagram of a three-tiered system for providing data services in a single host, illustrating an upper presentation tier, a federated bean middle tier and a management facade lower tier.

FIG. 2 shows a host system 200 that illustrates the contents of the three tiers running in a single host. The inventive data service management system comprises three layers or tiers: an upper tier 204, a middle tier 206 and a lower tier 208. The upper tier 204 is a presentation level that can be implemented with either a graphical user interface (GUI) 220 or a command line interface (CLI) 222. A manager interacts with this level, via the GUI 220 or CLI 222, in order to create, configure and manage a data services system.

The middle tier 206 is implemented with a plurality of Federated Java™ (trademark of Sun Microsystems, Inc.) beans. These beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at the Java website maintained by Sun Microsystems, Inc.

The federated beans use a distributed management framework that implements the FMA specification for distributed management of data services. This framework is called the Jiro™ framework (trademark of Sun Microsystems, Inc.) and is developed by Sun Microsystems, Inc. This framework uses the concept of a management domain to provide services. A management domain is a portion of a network with attached managed resources and available management services used to manage those resources. Within a management domain, the framework provides for base and dynamic services. The base services include, a controller service, an event service, a logging service, a scheduling service and a transaction service. The federated Java provides dynamic services beans of the middle tier. Dynamic services require a hosting entity called a "station", which is a mechanism to allow many services to run within a single Java Virtual Machine. Every management domain contains one or more general-purpose shared stations.

In addition, the Jiro™ technology provides a lookup service that is used to register and locate all Jiro™ technology services, including both base and dynamic services, that are available in a management domain. Details of the Jiro™ framework and its use are available in the "Jiro™ Technology SDK Programmer's Reference Manual" available at Jiro website maintained by Sun Microsystems. Inc., which manual is incorporated by reference in its entirety.

For volume management purposes, the main federated bean is the data services volume (DSV) bean 230. DSV Bean 230 is responsible for discovering volumes available on the local system 200, controlling those volumes when necessary via an SVI/STE management facade 240, and coordinating the use of those volumes between other data service federated beans. As discussed below, in the process of managing volumes, the DSV bean 230 uses other beans (not shown in FIG. 2) that may be located on the same, or different, machines. In addition, the GUI 220 and the CLI 222, which are part of the presentation layer 204, communicate with the DSV bean 230 running in the host 200 where the GUI 220 and CLI 222 are running as indicated in FIG. 2.

DSV Bean 230 is a Federated Bean as described in the aforementioned Federated Management Architecture (FMA) specification. When created, it registers itself with a local Jiro™ station, and provides its services to any other federated beans within the same Jiro™ management domain. Effectively, DSV Bean 230 provides other federated beans in the management domain acting as clients the ability to explicitly or implicitly control the SVI and STE data services on its host, as necessary.

Along with providing the ability to control the SVI and STE data services, DSV Bean 230 also gives clients the ability to discover what other applications are currently using a particular volume.

The volume managing capability of the invention is actually implemented in the kernel layer 210 shown running in host 200 in FIG. 2. In particular, access by the host 200 to a resource 260, which can be a data storage component, is provided by a layered stack 250 comprising the aforementioned SVI or STE layer 252, as appropriate. Application programs running in host 200, such as application 228, and the host file system access resource 260 though the layered stack 250 as indicated schematically by arrow 238.

In order to provide for data service management capability in accordance with the principles of the invention, the SVI/STE layer 252 and the data services layer 254 are controlled by software running on the lower tier 208 of the inventive data services system. The lower tier includes a native interface 242 that converts the APIs exported by the SVI/STE layer 252 into a platform-independent language, such as Java™. A DSV management facade 240 that provides the required remote management capability, in turn, controls the native interface 242.

The DSV management facade 240 provides a means by which the SVI/STE layer 252 can be accessed and managed as a Jiro™ service, i.e., a service that can be managed in a distributed environment from a remote host. The DSV management facade 244 is essentially an object-oriented model of the kernel-resident SVI/STE layer 252. It provides a collection of APIs to manage the SVI/STE layer 252. The DSV federated bean 230 uses the DSV management facade 240 to configure, control and examine the status of the SVI/STE layer 252 and to provide other important functions.

In this arrangement, the GUIs 220 and 224 or the CLIs 222 and 226 provides the presentation function, the federated beans 230 and 234 implement the management model and the management facades 240 and 244 act as the managed resource. All of the data services will have GUIs or CLIs that operate in a similar, unified environment. Each GUI is responsible for displaying and setting data service information. The attributes that can be set or displayed are retrieved via a proxy to a corresponding federated bean. In order to use a bean, a GUI performs a lookup for the federated bean service, and, if the service is found, the GUI downloads a proxy to that service and uses it to make calls on methods in the bean interface. The bean exports methods from a management facade that, in turn, exports methods from the native interface which mimics the data service. The information retrieved using the proxy is displayed in the GUI or the information the user enters to the GUI is submitted down the stack via the proxy. If the service is not found, an error will be relayed to the user.

Each CLI works in a manner very similar to the GUI with the exception of one step. The CLI is written as a script, which invokes a JAVA application that follows the same protocol used by the GUI to obtain a bean proxy, and then uses that proxy to call bean methods. In addition, each time the user enters a command, a new proxy is created, used, and destroyed.

Other data services are implemented and controlled in a similar manner. Illustratively, data services (DS) bean 234 implements one of the aforementioned data services and also communicates with the DSV bean 232, whenever bean 234 starts or stops using a volume managed by DSV bean 230. Management personnel can control DS bean 234 by means of a GUI 224 or a CLI 226. In order to manage a data services system, DS bean 234 communicates with a data services layer 254 in the layered stack 250, via a data services management facade 244 and a native interface 246. As with the corresponding DSV management facade 240 and native interface 242, the data services management facade 244 provides a means by which the data services layer 254 can be accessed and managed as a Jiro™ service. The native interface 246 converts the platform-specific kernel routine API's to platform independent interfaces. In a similar manner other data services can be implemented with other layers represented by layer 256. The native interfaces and management facades corresponding to native interfaces 242 and 246 and management facades 240 and 244 are not shown in FIG. 2 to simplify the drawing.

Whenever changes are made in the data configuration of host 200, both the DSV bean 230 and the DS bean 234 can inform a configuration manager bean (not shown in FIG. 2) of the change in configuration information. DS bean 234 can also retrieve configuration information from the configuration manager bean under appropriate situations. The configuration manager bean maintains a persistent view of the configuration of the data services system on host 200. In this manner, if the host is interrupted during an operation, it can be restored to the proper state when the operation is resumed.

Figure 3:
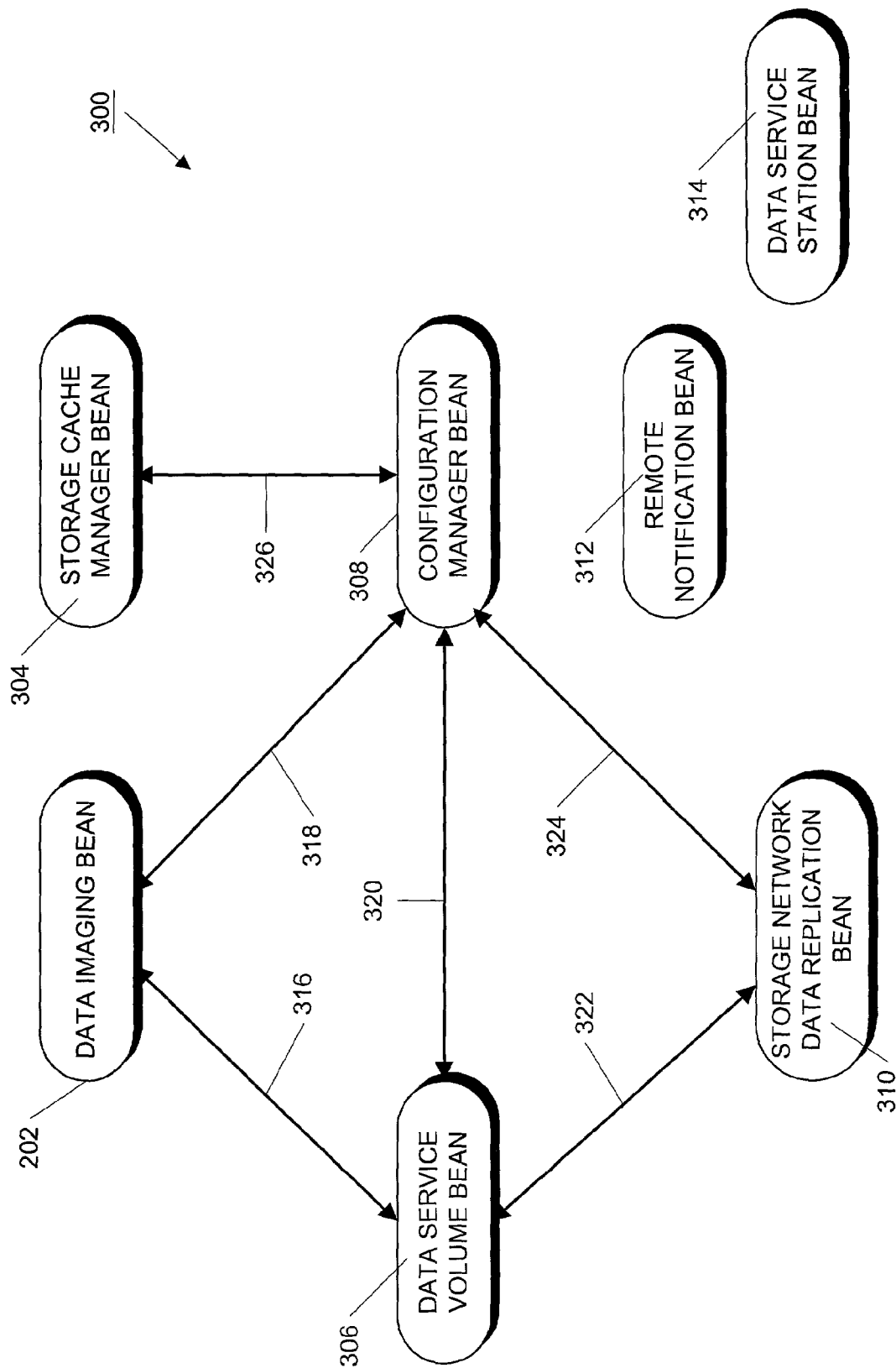
FIG. 3 is a block schematic diagram illustrating a collection of federated beans in an exemplary system and their interaction.

FIG. 3 illustrates a collection of federated beans as might be running in an exemplary host computer. This collection represents the middle tier of such a system. The corresponding upper and lower tiers have been omitted for clarity. A client, such as a GUI or CLI, can use these beans by obtaining a handle, or identifier, to a bean from a lookup service, such as the Jiro™ lookup service. Once the handle is obtained, it can be used to access an interface exported by the bean and call appropriate methods in the interface. The middle tier 300 comprises a data-imaging bean 302 that manages a "point-in-time" volume copy data service between volumes in a data image volume set. The bean 302 allows a manager to configure, via a GUI or CLI (not shown in FIG. 3), the master, shadow and bitmap volumes and to set up a volume copy between the master and shadow volumes. Other administrative tasks can also be accomplished via the bean 302.

A storage cache manager bean 304 manages caching operations for selected disk volumes, including read caching, read ahead and small write coalescing for sequential writes. The bean 304 allows system administrators to engage or disengage the caching operations "on the fly" to allow optimum system usage. Bean 304 also gathers cache statistics to allow system administrators to monitor caching operations and controls non-volatile RAM cards to enable write caching.

Storage network data replication bean 310 manages a data replication system that replicates a primary volume to a secondary volume over a network. The bean 310 allows system administrators to select and configure the primary and secondary volumes and to set up and start the data replication system and monitor its progress.

Whenever beans 302 and 310 start and stop using a particular volume to provide the data services they control, they contact the data service volume bean 306 and use it to manage the volumes that they use as indicated schematically by arrows 316 and 322. In this manner, the data service volume bean 306 can keep track of volume usage and, in some cases, can provide information to a requesting bean regarding the identity of other services using a particular volume and the type of usage.

Whenever changes are made in the configuration of the data services and data volumes controlled by beans 302, 304 306 or 310, the beans can inform a configuration manager bean 308 of the change in configuration information or request configuration information as indicated schematically by arrows 318, 320, 324 and 326. Configuration manager bean 308 maintains the overall configuration of the data services on the host on which it resides and persists this information by means of a direct interface with a storage system. In this manner the information is available at boot up so that the system can be restarted after a power down or failure and is also available to management personnel during the normal operation of the system.

Two additional beans, a remote notification bean and a data service station bean are also provided. As will be discussed below, the remote notification bean monitors events generated by the other beans and posted to an event service, such as the Jiro™ event service and reports occurrences of event in which an administrator has indicated interest by a human readable notice, such as an e-mail. The data service station bean 314 assists the data services beans in obtaining handles or identifiers to other beans by subscribing to the Jiro™ lookup service to obtain the bean handles and then caching the handles. Consequently, when a bean needs to obtain a handle to another data service bean, it can obtain the handle from the data service station bean.

Figure 4:
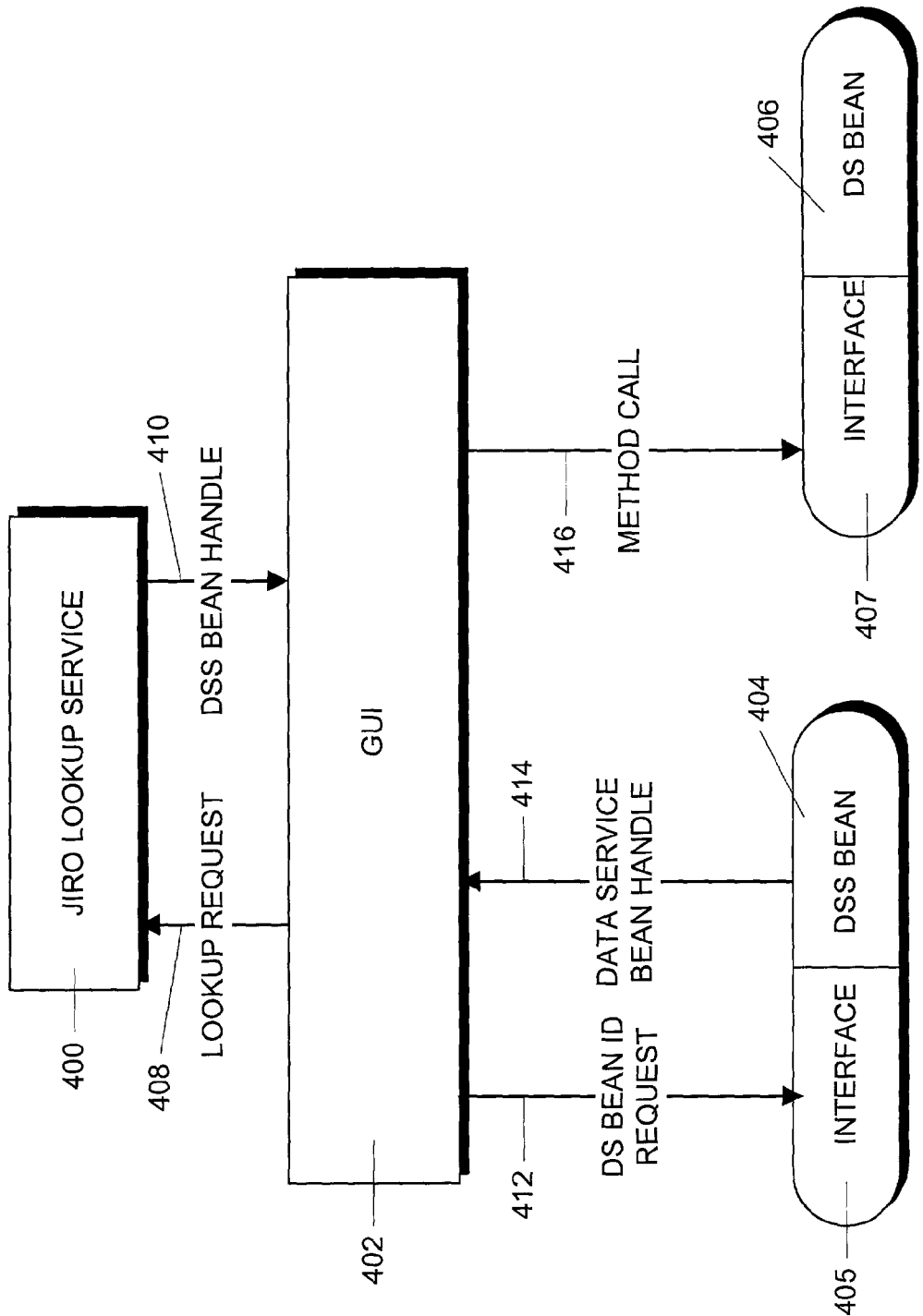
FIG. 4 is a block schematic diagram illustrating the use of a data service station bean to lookup other federated beans.

FIG. 4 illustrates, schematically, the operation of the data service station bean. In this figure, a client, such as GUI 402 uses the data service station (DSS) bean 404 to obtain a handle to another Data service (DS) bean 406. To obtain the DS bean handle, the GUI 402 sends a lookup request for the DSS bean 404 to the Jiro™ lookup service 400 as indicated by arrow 408. The lookup service 400 returns the DSS bean handle to the GUI 402 as indicated by arrow 410.

Next, using the DSS bean handle, the GUI 402 makes a call on a method in the interface 405 of the DSS bean 404 to request the handle of the DS bean 406. This call is illustrated by arrow 412. The DSS bean 404 returns the DS bean handle from its internal cache memory as indicated by arrow 414. Finally, using the DS bean handle retrieved from the DSS bean, the GUI can call methods in the DS bean interface 407 as illustrated by arrow 416.

Figure 5:
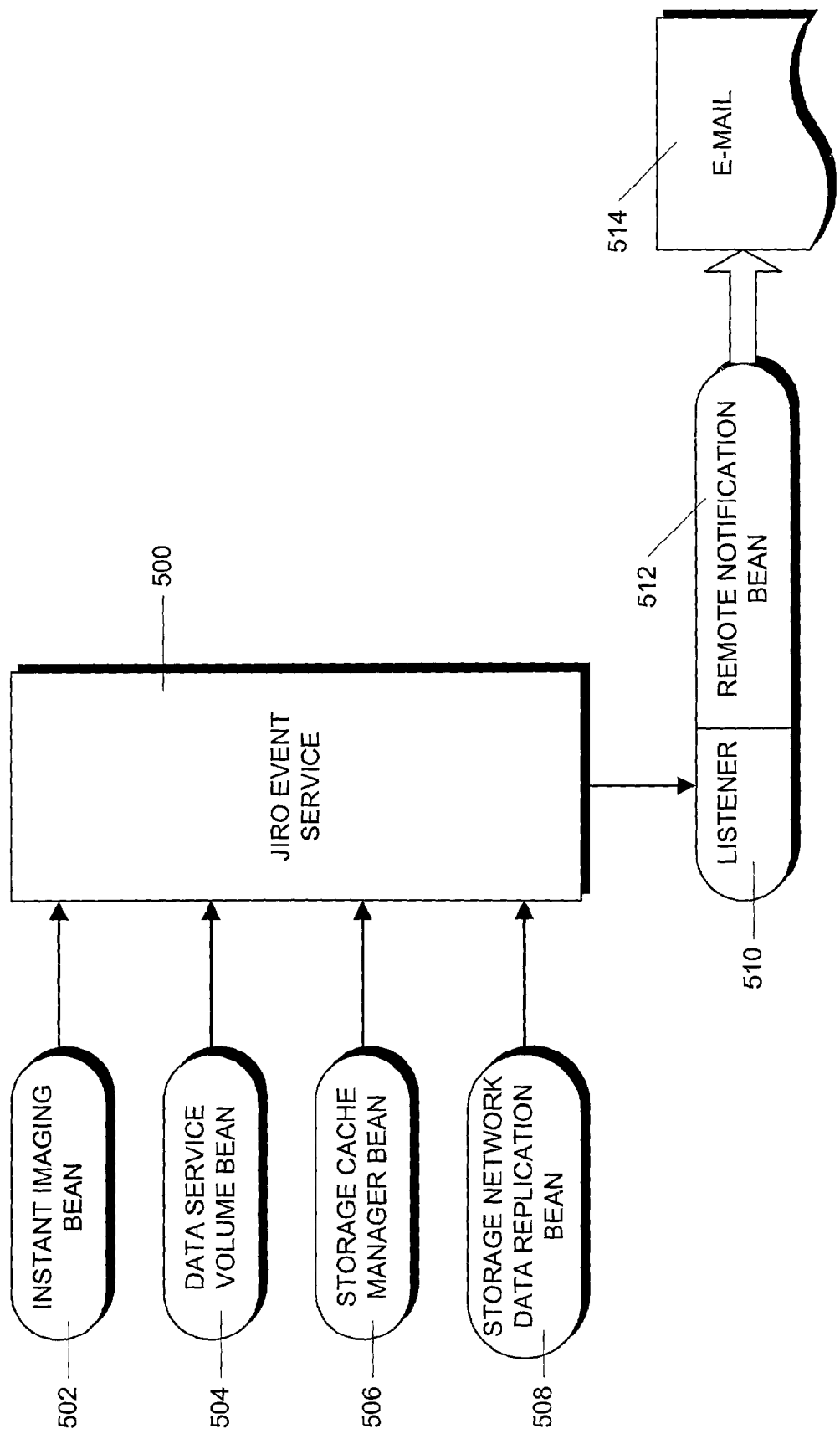
FIG. 5 is a block schematic diagram illustrating the operation of a remote notification bean in notifying administrators of management events in a data service management system.

The operation of the remote notification bean 312 is illustrated in FIG. 5. During operation, the data service beans, including the data imaging bean 502, the data service volume bean 504, the storage cache manager bean 506 and the storage network data replication bean 508 generate event messages and forward the messages to the Jiro™ event service 500. For example, these messages may be generated when a data service configuration changes, when an error is encountered or when a process finishes. When it receives these event messages, the Jiro™ event service sends notifications to the remote notification bean 512 which is registered with the event service 500 as a listener 510. The remote notification bean 512 then generates a human readable message and forwards the message to a system administrator via a conventional delivery system, such as an e-mail system 514.

Figure 6:
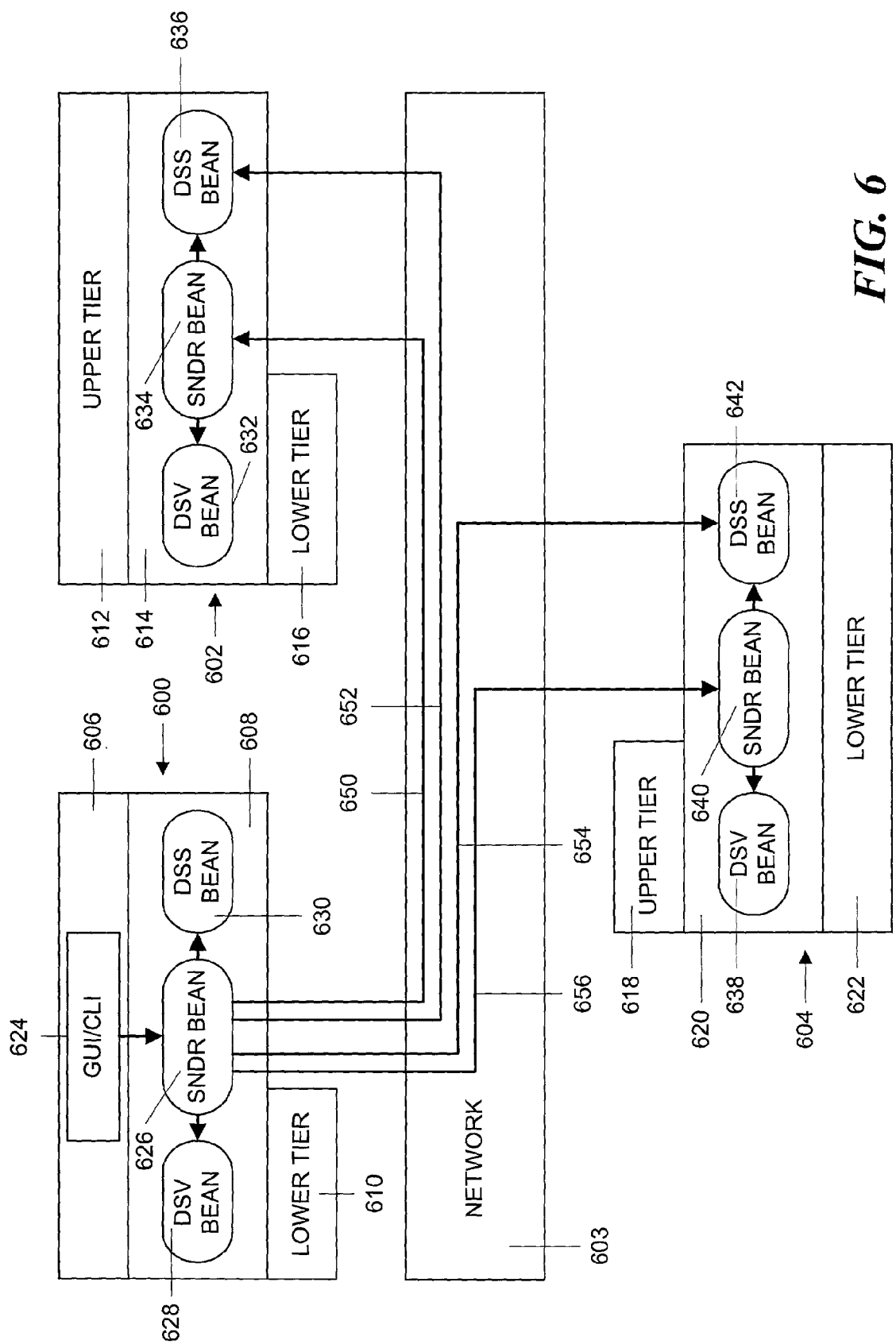
FIG. 6 is a schematic block diagram illustrating how multiple hosts communicate via the federated beans in the middle tier.

In addition to controlling data services on their own host as described above, the federated beans can communicate via a network connecting the hosts to control data services on other hosts. For example, FIG. 6 illustrates a system with three hosts 600, 602 and 604 connected by a network 603. Although each of hosts 600, 602 and 604 in this figure include the components illustrated in FIG. 2, only the middle tier has been shown in detail in each host 600, 602 and 604 in order to simplify the diagram.

Host 600 has an upper tier 606, a middle tier 608 and a lower tier 610. A GUI/CLI 624 running in the upper tier 606 of host 600 can be used by a manager to create and manage a data service, such as a storage network data replication (SNDR) system. A manager could also manage the system from a similar GUI/CLI running in upper tiers 612 and 618 of hosts 602 and 604, respectively.

GUI/CLI 624 interacts with an SNDR federated bean 626 running in host 600. As discussed with respect to FIG. 2, bean 626 can interact with a configuration manager bean 628 and a data service station bean 630 also running in the middle tier 608 of host 600. In a similar manner, an SNDR federated bean 634 is running in the middle tier 614 of host 602. Bean 634 can interact with a configuration manager bean 632 and a data service station bean 636 also running in the middle tier 614 of host 602. Another SNDR federated bean 640 is running in the middle tier 620 of host 604. Bean 640 can interact with a configuration manager bean 638 and a data service station bean 642 also running in the middle tier 620 of host 604.

Although a manager interacts with the GUI/CLI running in host 600, an exemplary data replication system can be created involving volumes located in two or more hosts. In order to provide communication between hosts, the SNDR beans in the various hosts can communicate with SNDR beans and data services beans in other hosts, via the network 603. For example, bean 626 can communicate with the data service station bean 630 on its host to ascertain the location of data service beans running on other hosts. Once the location of these data service beans is known, bean 626 can interact with the data service station beans running on these other hosts in order to retrieve federated bean proxies of other SNDR beans that are running on the other hosts. The federated bean proxies are identifiers or "handles" that can be used by bean 626 to call appropriate methods in other SNDR beans, whose methods are necessary to perform different operations. For example, bean 626 can contact data service station bean 636 on host 602, via network 603, as indicated schematically by arrow 652, in order to receive a federated bean proxy to SNDR bean 634. Using this proxy bean 626 can then communicate directly with bean 634 by calling methods in bean 634 as indicated schematically by arrow 650.

In a similar manner, bean 626 can contact data service station bean 642 on host 604, via network 603, as indicated schematically by arrow 654 in order to receive a federated bean proxy to SNDR bean 640. Using this proxy, bean 626 can then communicate directly with bean 640 by calling methods in bean 640 as indicated schematically by arrow 656.

Using federated bean proxies, as appropriate, a manager who controls bean 626 can also control SNDR beans running in other hosts to configure, control and monitor the SNDR data service layers in those hosts, via a management facade and a native interface as previously discussed, in order to locate, prepare and manage volumes in those hosts. This arrangement gives an administrator working with GUI/CLI 624 the capability of remotely managing data replication as opposed to the prior art mechanism of purely primary and secondary host-based management. When an SNDR federated bean encounters an error in a remote operation carried out on a proxy it retrieved earlier, it retrieves the proxy again and retries the operation before throwing an error. This retry capability allows a restart of other services that are necessary for the data replication system to perform its functions.

Figure 7:
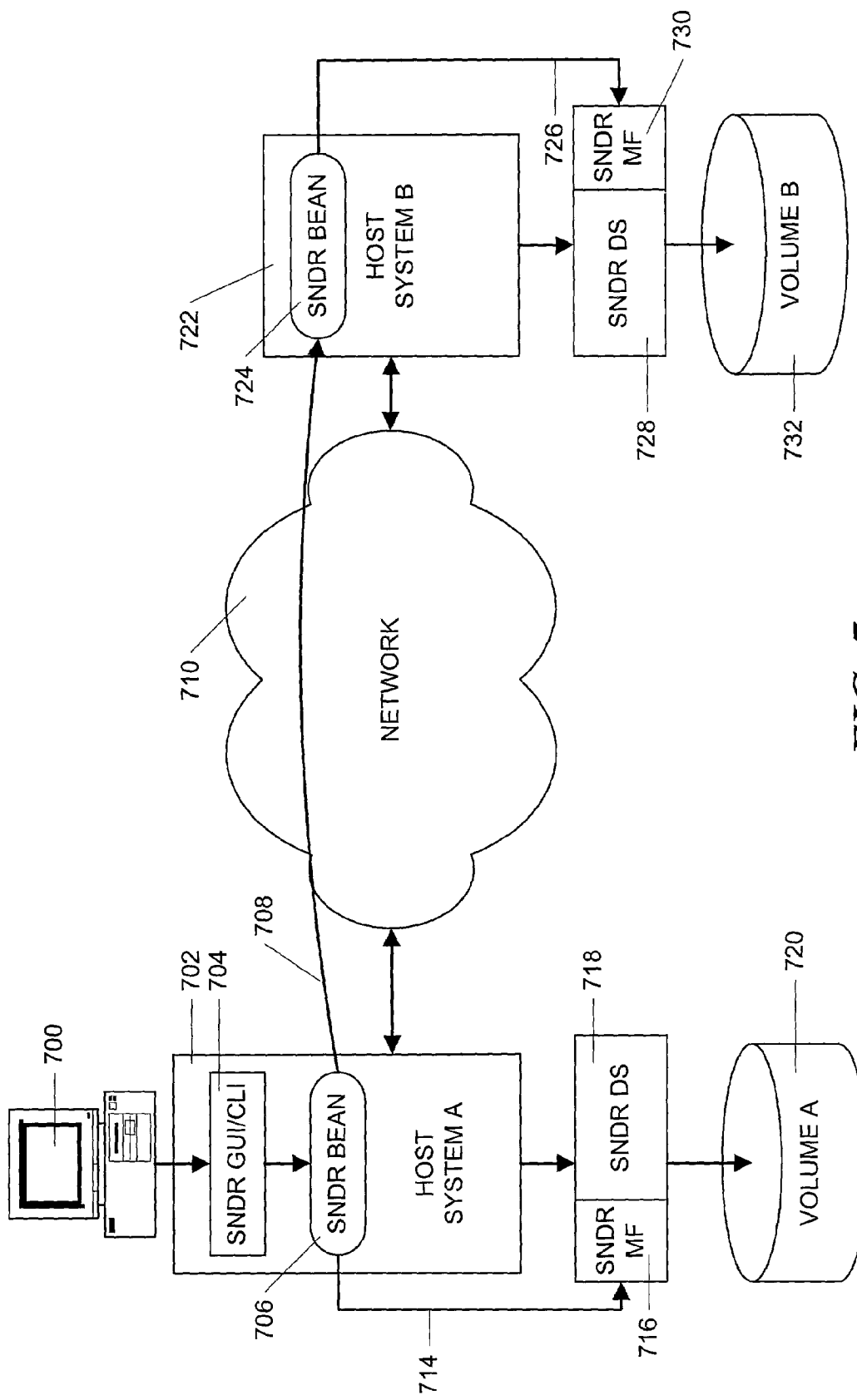
FIG. 7 is a schematic block diagram illustrating the implementation of a simple data replication system using the principles of the present invention.
Figure 8:
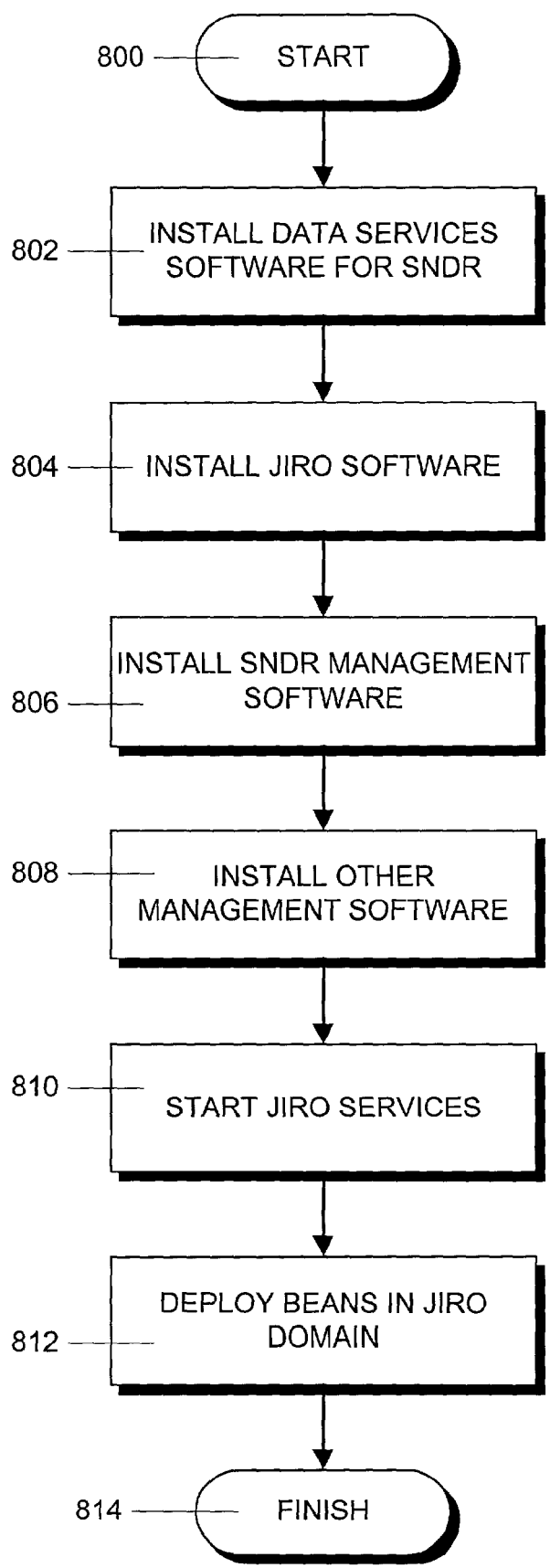
FIG. 8 is a flowchart showing the steps of an illustrative process for installing data replication software in the system of FIG. 7.
Figure 9A:
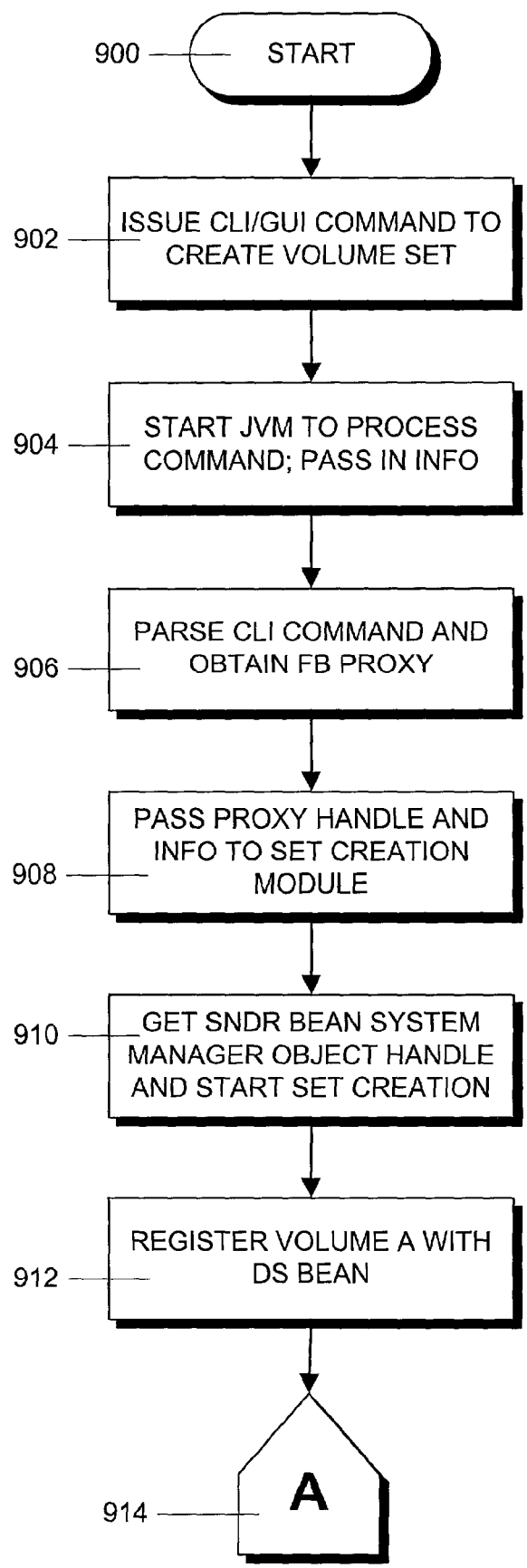
FIGS. 9A–9D, when placed together, form a flowchart showing the steps of an illustrative process for configuring the data replication system of FIG. 7.
Figure 9B:
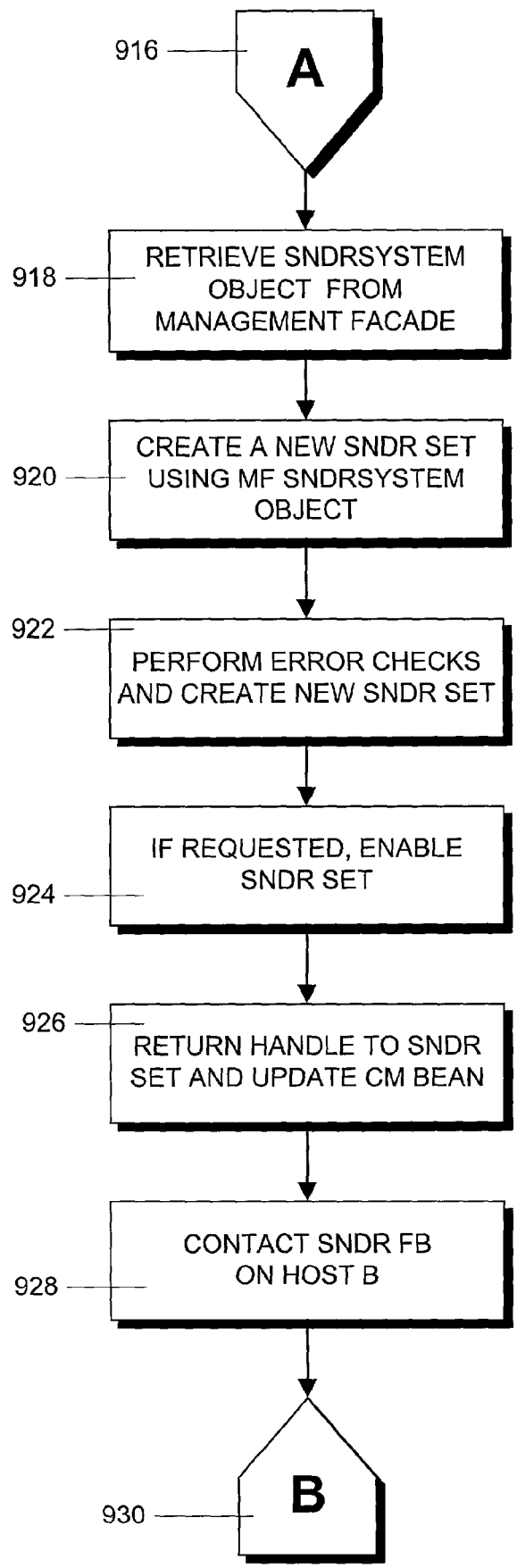
Figure 9C:
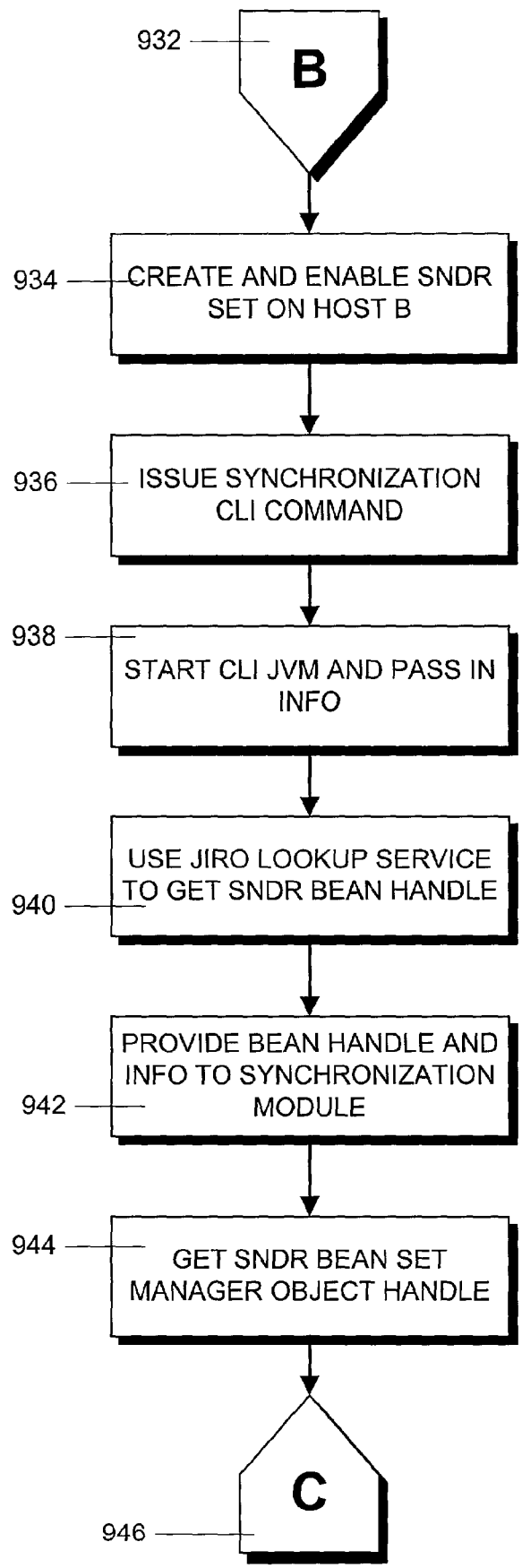
Figure 9D:
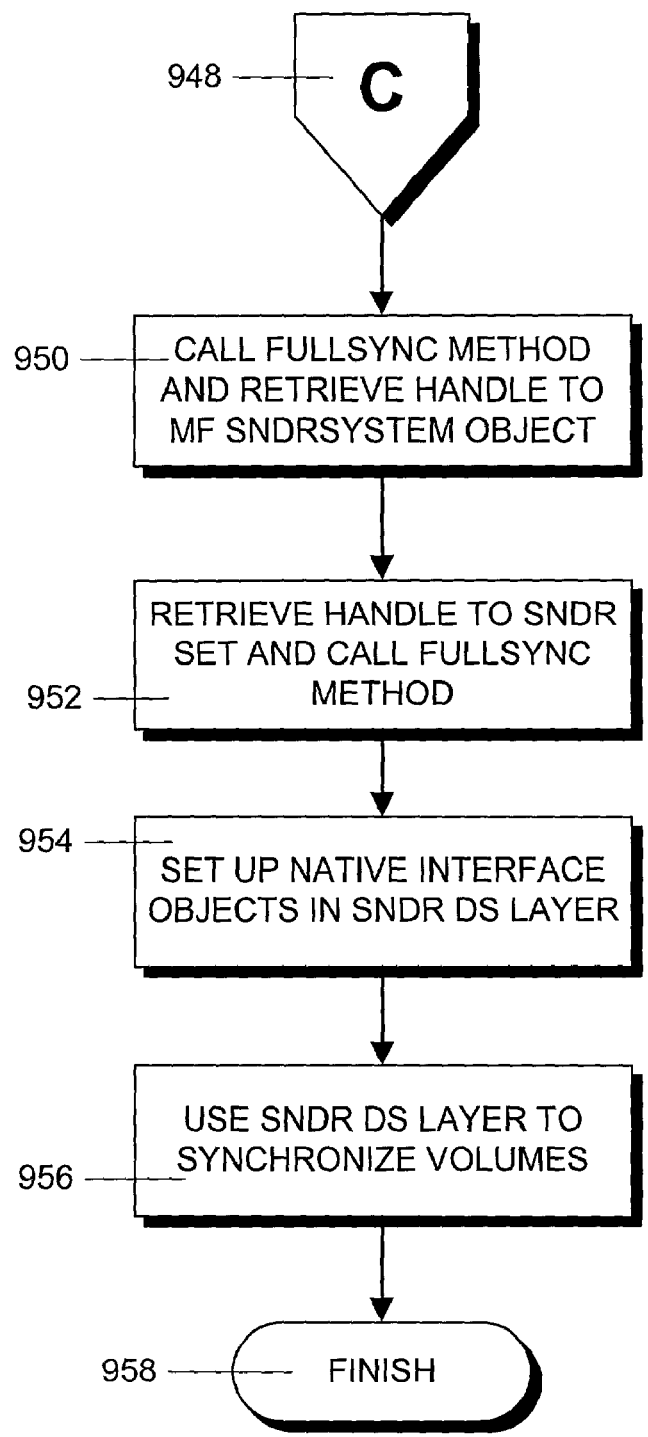

An example data services system that performs data replication and is managed in accordance with the principles of the invention is illustrated in FIG. 7. FIG. 8 illustrates the steps performed in initially configuring the system. FIGS. 9A–9D show a flowchart illustrating the steps carried out by a data replication system using the principles of the invention to set up the configuration shown in FIG. 7 and to remotely replicate data from volume A (720) of host system A (702) located in geographic region I to volume B (732) of host system B (722) located in a different geographic region II using the inventive data service management software, via network 710.

In order to use the inventive system, the software that is required must first be installed in the system. The steps of the installation process on one host (for example, host system A in geographic region I) are shown in FIG. 8. The installation process begins in step 800 and proceeds to step 802 where the data services software, such as that used by the SNDR system, is installed on host system A 702. This software includes the data service volume layer software 252 and a data services layer, such as a network data replicator layer 254. Other data service layers, such as a cache layer, can also be included in this installation process.

Next in step 804, the Jiro™ software is installed. The installation process for this software is explained in detail in the aforementioned Jiro SDK.

In step 806, the data service management software is installed. This software includes an SNDR management facade 244 and the native interface 246. It also includes a SNDR federated bean 234 and the command line interface 224 or graphic user interface 226, as appropriate.

In step 808, other necessary management services software is installed. This software includes other management facades, such as the data services volume management facade 240 and its accompanying native interface 242 and federated beans such as a configuration manager bean (not shown in FIG. 2) and the data service volume bean 230.

Then, in step 810, the Jiro services software is started with the Jiro domain name jiro:Host_a. In step 812, the SNDR and other federated beans are deployed in the Jiro domain. During this step, necessary management facades get automatically instantiated. The process then finishes in step 814.

A process equivalent to that shown in FIG. 8 is also carried out on host B 722 in geographic region II, except that the Jiro domain name will be jiro:Host_b for host B.

After the installation and deployment steps are complete in both host A 702 and host B 722, the process of configuring the system can begin. The steps involved in this process are illustrated in FIGS. 9A–9D. During this process, the system manager executes two CLI commands, or equivalently, uses the SNDR GUI to generate the two commands. The first command creates and enables an SNDR volume set in both host A 702 and host B 722. The SNDR volume set includes a primary volume and a secondary volume. The second command synchronizes volume B 732 (the secondary volume of the SNDR set) with volume A 720 (the primary volume of the SNDR set). Once the synchronization is complete, the SNDR set will be in REPLICATING mode. From that time, all the input/output information sent to volume A 720 will automatically be replicated to volume B 732, and the content of both the volumes will be the same (that is, "mirrored").

The configuration process begins in step 900 and proceeds to step 902 where, from the command prompt at terminal 700, the system manager issues the following command, or a similar command:

sndradm -C p s y n MySNDRSet Host_a Volume_a
        MetaInfoVolume_a Host_b Volume_b MetaInfo-
        Volume_b Alternatively, the command can be generated from information entered into a GUI. In the discussion below, use of the CLI program is assumed. Those skilled in the art would know that the GUI disclosed above could also be used in an equivalent fashion. As set forth in step 904, entry of the command, starts a Java Virtual Machine (JVM) for the SNDR CLI program 904 and passes in necessary information, such as an identification of the host in which the CLI was issued (host A 702), a port number for the Jiro™ service (typically 4160), the Jiro domain name in which the federated beans, including bean 706, and management facades, including management facade 716 are deployed (in this case jiro:Host_a) as well as the SNDR options used in sndradm command.

Next, in step 906, the SNDR CLI program 704 parses the command line options used while invoking the sndradm module. After parsing the options, the CLI program 704 determines that the sndradm module was invoked to create a SNDR volume set. Since this operation will need to use the SNDR federated bean 704, the CLI program 704 uses a lookup service that is part of the Jiro program to get a proxy handle of the SNDR federated bean 704 that is managing the SNDR data services 718 on host A 702 in the domain jiro:Host_a.

Once the SNDR CLI program 704 locates the appropriate SNDR federated bean 706 and retrieves the proxy handle to the bean 706, in step 908, the CLI program 704 hands over the proxy handle and all other command line arguments passed in for SNDR set creation to a module or subprogram (realized by a Java class) that performs the rest of the specialized steps involved for SNDR set creation.

In step 910, the SNDR CLI set creation module then calls a getSNDRBeanSystemManager( ) method on the SNDR federated bean proxy handle to retrieve a handle to a SNDRBeanSystemManager object which manages the overall SNDRSystem and provides APIs to create SNDR sets. The SNDR CLI set creation module then informs the SNDRBeanSystemManager of its intention to create a SNDR set using the user-provided parameters for different components of the SNDR set by calling an initializeSet( ) method of the SNDRBeanSystemManager( ) object with appropriate arguments.

In the initializeset( ) method, in step 912, the SNDRBeanSystemManager informs a data service volume federated bean (not shown in FIG. 7) running on host A 702 about volume A 720 in this host that the SNDR federated bean 704 is going to use. The SNDRBeanSystemManager does that by calling a registerSVIVolume( ) method of the data service volume federated bean with appropriate volume names as arguments in order to register the volumes with the data service volume federated bean.

The process then proceeds, via off-page connectors 914 and 916 to step 918 where, the SNDRBeanSystemManager object calls a getSNDRSystem( ) method of SNDR bean 704. Inside the getSNDRSystem( ) method, SNDR bean 704 contacts the SNDR management facade 716 (indicated schematically by arrow 714), retrieves a handle to the SNDRSystem object that the management facade 716 is using as the manager of individual SNDR sets and groups, and returns the handle to the SNDRBeanSystemManager object.

Once the SNDRBeanSystemManager object gets the SNDRSystem handle from the management facade layer 716, in step 920, it asks the SNDRSystem object to create a SNDR set with the user provided data by calling the initializeSet( ) method of the SNDRSystem object. This latter method call is at the management facade layer 716 and, in the initializeSet( ) method, the task of set initialization gets delegated to another initialize( ) method of the SNDRManagerImpl, a module/subprogram implements the management facade SNDRSystem.

In step 922, the SNDRManagerImpl initialize( ) method first performs several error checks. For example, it checks for the validity of the user provided data 10 and whether the resulting SNDR set will violate any constraints, etc. If all the checks are passed, then a new SNDRSet object is created and added to the list of the SNDR sets managed by this SNDRManagerImpl. At this stage, the newly created SNDR set is in a DISABLED state and the kernel does not yet know of this set.

If the manager indicated in the CLI command that the newly-created SNDR set should be enabled as well during the initialization step itself (as in the command referenced above), then, in step 924, the SNDRManagerImpl object calls an enable( ) method of this newly-created SNDR set. In this enable( ) method, a set of native interface objects are created to communicate with the host A kernel. These native interface objects are populated with the appropriate SNDR set information and SNDR data services layer 718 is requested to enable a SNDR set with the information passed through these native objects. The data services kernel layer 718 then enables the set by updating/creating new internal kernel data structures. The enabled set goes into LOGGING mode immediately as host B might, or might not, be ready. (In the situation described now, the other side is actually not ready yet.) In any case, the kernel does not automatically try to enter REPLICATING mode by contacting the other host.

Next, in step 926, after the new SNDR set is created and enabled, a handle to it is returned to the SNDRBeanSystemManager object. The SNDRBeanSystemManager then contacts a configuration manager federated bean running on host A (not shown in FIG. 7) in order to indicate that a new SNDR set has been created. The configuration manager federated stores the information related to this new SNDR set. This configuration information can be retrieved later.

In step 928, the SNDRBeanSystemManger object contacts SNDR federated bean 724 running on host B 722 where the data in volume A 720 will be replicated for this SNDR set. This contact is made, via network 710, as indicated schematically by arrow 708. The process then proceeds, via off-page connectors 930 and 932 to step 934. In step 934, an SNDR set is created and enabled on host B 722. In particular, SNDR federated bean 724 on host B 722 creates and enables an SNDR set on host B 722 by contacting the management facade 730 as indicated by arrow 726 and performing the process similar to that detailed in steps 910 through 926. During this process, the SNDR data service layer 728 is used to create the new SNDR set.

At this point, a new SNDR set has been created and enabled at both hosts 702 and 722 and the CLI command issued in step 902 has been completed. In order to start replication of I/O information destined for primary volume A 720 to the secondary volume B 732, primary volume 720 and secondary volume 732 need to be synchronized. Synchronization is achieved by using another CLI command. In particular, after completion of the first command, in step 936, a system manager issues the following command on terminal 700:

sndradm -c s MySNDRSet

When the command mentioned above is issued, the CLI program 702 performs several steps similar to steps 904–908. These steps include, starting a Java Virtual Machine for the SNDR CLI program 704 and passing in necessary information (step 938), parsing the command line options and using the Jiro lookup service to get a proxy handle of the SNDR federated bean 704 (step 940) and handing over the proxy handle and all other command line arguments to a synchronization subprogram/module that actually performs the synchronization (step 942.)

In step 944 the synchronization module of the CLI program 704 calls a getSNDRBeanSetManager( ) method on the proxy handle to the SNDR federated bean 706 to retrieve a handle to the SNDRBeanSetManager object which manages the operations pertaining to individual SNDR sets.

The process then proceeds, via off-page connectors 946 and 948, to step 950 where the synchronization module calls a fullSync( ) method of the SNDRBeanSetManager object for the appropriate SNDRSet. The fullSync( ) method of SNDRBeanSetManager object, in turn, calls the getSNDRSystem( ) method of SNDR bean 706. Inside the getSNDRSystem( ) method, the SNDR bean 706 contacts the SNDR management facade 716, retrieves a handle to the SNDRSystem object that the management facade 716 is using as the manager of individual SNDR sets and groups, and returns the handle to the SNDRBeanSetManger.

Then, in step 952, the SNDRBeanSetManager object uses the handle to retrieve another handle to the appropriate SNDRSet by calling getSNDRSet( ) method on the SNDRSystem object. After that, the fullSync( ) method on the retrieved handle of SNDRSet is called.

In the fullSync( ) method of the SNDR set, necessary objects in the native interface (not shown in FIG. 7) are set up for communication with the SNDR data services layers 718 and 728 in step 954. In step 956, the SNDR data service layer 718 is then requested to synchronize the primary and secondary volumes through these native library objects and method calls. Once the synchronization is complete, the SNDR set goes to the REPLICATING mode and the process ends in step 958. From this time on, all the I/O information destined for the primary volume 720 will automatically be replicated to the secondary volume 732 as well.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A computer-implemented method for managing a data service from a management terminal in a distributed computer system having a host computer system with a lookup service and at least one storage device connected to the host computer system by driver software that does not provide the data service, the method operating without reconfiguring the driver software and comprising:

(a) running, in the host, management facade software that intercepts data flowing between the driver software and the storage device and redirects that data to a kernel module, which is resident on the host computer system and provides the data service by replicating data on the storage device and at least one other storage volume, and that retrieves attributes of the data service from the kernel module;

(b) running, in the host, a federated bean that exports an interface containing methods that generate commands to the management facade;

(c) using the lookup service to obtain a proxy to the federated bean; and (d) in response to commands received from the management terminal, using the proxy to make method calls on the federated bean interface to cause the management facade to control the data passing between the driver software and the storage device and to retrieve data service attributes in order to manage the data service.

2. The method of claim 1 wherein step (d) comprises using a command line interface in the management terminal to generate the commands.

3. The method of claim 1 wherein step (d) comprises using a graphical user interface in the management terminal to generate the commands.

4. The method of claim 1 wherein the storage device is a non-SCSI device and step (a) comprises inserting a SCSI terminal emulation interface layer between the driver software and the storage device, which Interface layer makes the storage device appear as a SCSI device.

5. The method of claim 1 wherein the distributed computer system comprises a plurality of host computer systems each having at least one storage device connected to the each host computer system by driver software and step (a) comprises running in each of the plurality of hosts, management facade software that controls data passing between the driver software and the storage device in the each host and that retrieves attributes of the data service; and step (b) comprises running, in each host, a federated bean that exports an interface containing methods that generate commands to the management facade in the each host.

6. The method of claim 5 wherein step (c) comprises using the lookup service to obtain a first proxy to a first federated bean in one host computer system and using the first proxy to control the first federated bean retrieve a second proxy of a second federated bean running in a second host.

7. The method of claim 6 further comprising:
   (e) using the second proxy to control the second federated bean from the first host computer system.

8. Apparatus for managing a data service from a management terminal in a distributed computer system having a host computer system with a lookup service and at least one storage device connected to the host computer system by driver software that does not provide the data service, the apparatus operating without reconfiguring the driver software and comprising:
   management facade software that runs in the host computer system, that intercepts data flowing between the driver software and the storage device and redirects that data to a kernel module, which is resident on the host computer system and provides the data service by replicating data on the storage device and at least one other storage volume, and that retrieves attributes of the data service from the kernel module;
   a federated bean that runs in the host computer system and exports an interface containing methods that generate commands to the management facade;
   a mechanism that uses the lookup service to obtain a proxy to the federated bean; and
   a mechanism that responds to commands received from the management terminal, and that uses the proxy to make method calls on the federated bean interface to cause the management facade to control the data passing between the driver software and the storage device and to retrieve data service attributes in order to manage the data service.

9. The apparatus of claim 8 wherein the mechanism that responds to commands received from the management terminal comprises a command line interface in the management terminal.

10. The apparatus of claim 8 wherein the mechanism that responds to commands received from the management terminal comprises a graphical user interface in the management terminal.

11. The apparatus of claim 8 wherein the storage device is a non-SCSI device and the management facade software comprises a SCSI terminal emulation interface layer inserted between the driver software and the storage device, which interface layer makes the storage device appear as a SCSI device.

12. The apparatus of claim 8 wherein the distributed computer system comprises a plurality of host computer systems each having at least one storage device connected to the each host computer system by driver software and wherein the management facade software comprises management facade software running in each of the plurality of hosts that controls data passing between the driver software and the storage device in the each host and that retrieves attributes of the data service; and wherein a federated bean runs in each host computer system and exports an interface containing methods that generate commands to the management facade in the each host.

13. The apparatus of claim 12 wherein the mechanism that uses the lookup service to obtain a proxy to the federated bean comprises a first mechanism that uses the lookup service to obtain a first proxy to a first federated bean in one host computer system and a second mechanism that uses the first proxy to control the first federated bean retrieve a second proxy of a second federated bean running in a second host.

14. The apparatus of claim 13 further comprising a third mechanism that uses the second proxy to control the second federated bean from the first host computer system.

15. A computer program product for managing a data service from a management terminal in a distributed computer system having a host computer system with a lookup service and at least one storage device connected to the host computer system by driver software that does not provide the data service, the computer program product operating without reconfiguring the driver software and comprising a tangible computer usable medium having computer readable program code thereon that is executable by a computer, including:
   management facade software that runs in the host computer system, that intercepts data flowing between the driver software and the storage device and redirects that data to a kernel module, which is resident on the host computer system and provides the data service by replicating data on the storage device and at least one other storage volume, and that retrieves attributes of the data service from the kernel module;
   federated bean program code that can run in the host computer system and that exports an interface containing methods that generate commands to the management facade;
   program code that uses the lookup service to obtain a proxy to the federated bean program code; and
   program code that responds to commands received from the management terminal and uses the proxy to make method calls on the federated bean interface to cause the management facade to control the data passing between the driver software and the storage device and to retrieve data service attributes in order to manage the data service.

16. The computer program product of claim 15 wherein the program code that uses the proxy to make method calls on the federated bean interface comprises a command line interface in the management terminal.

17. The computer program product of claim 15 wherein the program code that uses the proxy to make method calls on the federated bean interface comprises a graphical user interface in the management terminal.

18. The computer program product of claim 15 wherein the distributed computer system comprises a plurality of host computer systems each having at least one storage device connected to the each host computer system by driver software and the management facade software comprises management facade software running in each of the plurality of hosts that controls data passing between the driver software and the storage device in the each host and that retrieves attributes of the data service; and wherein a federated bean runs in each host and exports an interface containing methods that generate commands to the management facade in the each host.

19. The computer program product of claim 18 wherein the program code that uses the lookup service to obtain a proxy to the federated bean program code comprises program code that uses the lookup service to obtain a first proxy to a first federated bean in one host computer system and using the first proxy to control the first federated bean retrieve a second proxy of a second federated bean running in a second host.

20. The computer program product of claim 19 further comprising program code that uses the second proxy to control the second federated bean from the first host computer system.

21. Apparatus for managing a data service from a management terminal in a distributed computer system having a host computer system with a lookup service and at least one storage device connected to the host computer system by driver software that does not provide the data service, the apparatus operating without reconfiguring the driver software and comprising:

- means operable in the host computer system, for intercepting data flowing between the driver software and the storage device and redirecting that data to a kernel module, which is resident on the host computer system and provides the data service by replicating data on the storage device and at least one other storage volume, and retrieving attributes of the data service from the kernel module;
- federated bean means operable in the host computer system for exporting an interface containing methods that generate commands to the management facade;
- means for using the lookup service to obtain a proxy to the federated bean; and
- means responsive to commands received from the management terminal, for using the proxy to make method calls on the federated bean interface to cause the management facade to control the data passing between the driver software and the storage device and to retrieve data service attributes in order to manage the data service.

22. The apparatus of claim 21 wherein the distributed computer system comprises a plurality of host computer systems each having at least one storage device connected to the each host computer system by driver software and wherein the means operable in the host computer system, for controlling data passing between the driver software and the storage device comprises means running in each of the plurality of hosts for controlling data passing between the driver software and the storage device in the each host and that retrieves attributes of the data service; and wherein a federated bean means runs in each host computer system for exporting an interface containing methods that generate commands to the management facade in the each host.

23. The apparatus of claim 22 wherein the means for using the lookup service to obtain a proxy to the federated bean comprises first means for using the lookup service to obtain a first proxy to a first federated bean in one host computer system and second means for using the first proxy to control the first federated bean retrieve a second proxy of a second federated bean running in a second host.

24. The apparatus of claim 23 further comprising third means for using the second proxy to control the second federated bean from the first host computer system.

* * * * *